(12) United States Patent
Kepplinger et al.

(10) Patent No.: US 7,597,739 B2
(45) Date of Patent: Oct. 6, 2009

(54) METHOD FOR REDUCING A PARTICULATE MATERIAL CONTAINING A METAL, ESPECIALLY IRON ORE

(75) Inventors: Leopold Werner Kepplinger, Leonding (AT); Johann Reidetschlager, Linz (AT); Johannes Schenk, Linz (AT); Siegfried Zeller, Leonding (AT); Konstantin Milionis, Linz (AT); Hanspeter Ofner, Pucking (AT)

(73) Assignee: Voest-Alpine Industrieanlagenbau GmbH & Co. (AT)

( * ) Notice: Subject to any disclaimer, the term of this patent is extended or adjusted under 35 U.S.C. 154(b) by 286 days.

(21) Appl. No.: 11/820,749

(22) Filed: Jun. 20, 2007

(65) Prior Publication Data

US 2007/0245853 A1    Oct. 25, 2007

Related U.S. Application Data

(63) Continuation of application No. 10/813,140, filed on Mar. 29, 2004, now abandoned, which is a continuation of application No. PCT/AT02/00254, filed on Aug. 28, 2002.

(30) Foreign Application Priority Data

Sep. 27, 2001  (AT) ............................. A 1533/2001

(51) Int. Cl.
    *C21B 13/14*    (2006.01)
(52) U.S. Cl. ................. 75/450; 75/451; 75/490
(58) Field of Classification Search .......... None
    See application file for complete search history.

(56) References Cited

U.S. PATENT DOCUMENTS 3,562,780 A    2/1971    Eisenberg .................. 75/26
4,179,282 A *  12/1979   Rubio ....................... 75/495

(Continued)

FOREIGN PATENT DOCUMENTS

EP    0 571 358    11/1993

(Continued)

OTHER PUBLICATIONS

Wolfgang Hillisch et al. "Status der Finmet-Anlage Bei BHP in Australien Status of Finmet plant operation at BHP in Australia," Stahl und Eisen, Verlag Stahleisen GmbH Dusseldorf, DE, vol. 121, No. 9, Sep. 14, 2001, pp. 29-32, XP001081234, ISSN: 0340-4803, p. 30-p.32; Figure 3.

*Primary Examiner*—George Wyszomierski
(74) *Attorney, Agent, or Firm*—Ostrolenk Faber LLP

(57)    ABSTRACT

In a process for reducing iron-ore-containing particulate material in at least a two-stage process, reducing gas is conducted through at least two reaction zones consecutively arranged in series and formed by a moving particulate material and the particulate material passes through the reaction zones in reverse order to the reducing gas, with the particulate material being heated in the reaction zone arranged first for the particulate material and being reduced in the further reaction zone.

In order to achieve a maximum preheating temperature without any formation of magnetite, the reducing gas added to the first reaction zone is conditioned such that no or hardly any reduction takes place, although for the particulate material a preheating temperature within the fringe range of starting a reduction is achieved, whereby either the degree of oxidation of the reducing gas is increased or the temperature of the reducing gas is decreased or both measures are carried out jointly and whereby, in the reactor zone arranged second for the iron ore, a temperature level of at least about 600° C., preferably in the range of between 600 and 700° C., in particular of between 620 and 660° C., is adjusted and the iron-oxide-containing material is reduced to wuestite (FIG. 1).

33 Claims, 3 Drawing Sheets

U.S. PATENT DOCUMENTS

| | | | | |
|---|---|---|---|---|
| 4,179,284 | A | * | 12/1979 | Weigel et al. .................. 75/443 |
| 4,898,712 | A | * | 2/1990 | Dosaj et al. .................. 420/578 |
| 5,082,251 | A | | 1/1992 | Whipp ....................... 266/142 |
| 5,531,424 | A | | 7/1996 | Whipp ....................... 266/156 |
| 6,336,954 | B1 | | 1/2002 | Zeller et al. .................... 75/380 |
| 6,488,770 | B1 | | 12/2002 | Meissner et al. .............. 117/73 |

FOREIGN PATENT DOCUMENTS

| | | |
|---|---|---|
| FR | 1 535 033 | 8/1968 |
| JP | 63 140017 | 6/1988 |
| WO | 92/02458 | 2/1992 |
| WO | 99 09220 | 2/1999 |

* cited by examiner

METHOD FOR REDUCING A PARTICULATE MATERIAL CONTAINING A METAL, ESPECIALLY IRON ORE

CROSS REFERENCE TO RELATED APPLICATIONS

The present application is a continuation of patent application Ser. No. 10/813,140, filed Mar. 29,2004, by Leopold Werner Kepplinger et al., entitled METHOD FOR REDUCING A PARTICULATE MATERIAL CONTAINING A METAL, ESPECIALLY IRON ORE, the contents of which are hereby incorporated herein by reference, which is a continuation of International Application PCT/AT02/00254, filed Aug. 28, 2002, published in the German language which claims priority from Austrian Application A 1533/2001 filed Sep. 27, 2001.

BACKGROUND OF THE INVENTION

The invention relates to a process for reducing iron-ore-containing particulate, in particular fine-particulate, material in at least a two-stage process, wherein reducing gas is conducted through at least two reaction zones consecutively arranged in series and formed by a moving particulate material. The particulate material passes through the reaction zones in reverse order to the reducing gas. The particulate material is heated in the reaction zone arranged first for the particulate material and is reduced in the further reaction zone or in the further reaction zones, respectively.

A process of that kind is known from U.S. Pat. No. 5,082,251, WO-A-92/02458 and EP-A-0 571 358. According to U.S. Pat. No. 5,082,251, iron-rich fine ore is reduced in a system of fluidized-bed reactors arranged in series by aid of a reducing gas under elevated pressure. The thus produced iron powder is then subjected to hot or cold briquetting.

The reducing gas is produced by catalytic reformation of desulfurized and preheated natural gas with superheated water vapour in a conventional reformer furnace. After this, the reformed gas is cooled in a heat exchanger and, subsequently, the $H_2$ portion in the reducing gas is increased by CO conversion with the aid of an iron oxide catalyst. Subsequently, the $CO_2$ forming as well as the $CO_2$ coming from the reformer are eliminated in a $CO_2$ scrubber.

This gas is mixed with the reducing gas (top gas) consumed only partially, is heated, and the fine ore is reduced in three steps (three fluidized-bed reactors) in counterflow.

The ore flow starts with drying and subsequent screening. Then, the ore gets into a preheating reactor in which natural gas is burnt. In three consecutive reactors, the fine ore is reduced under elevated pressure.

From EP-A-0 571 358 it is known to carry out the reduction of fine ore not exclusively via the strongly endothermic reaction with $H_2$ according to

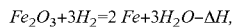
$Fe_2O_3 + 3H_2 = 2\,Fe + 3H_2O - \Delta H$, but additionally via the reaction with CO according to

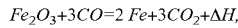
$Fe_2O_3 + 3CO = 2\,Fe + 3CO_2 + \Delta H$, which is an exothermic reaction. Thereby, it is feasible to considerably lower the operational costs, in particular the energy costs, involved.

According to the prior art, direct reduction, because of the kinetics of the known processes, involves magnetite formation during direct reduction in a layer constantly growing from outside towards inside and forming on each particle or grain of the iron-oxide -containing material. It has been shown in practice that the formation of magnetite has an inhibiting effect on direct reduction with a reducing gas. Thus, it is feasible only at elevated expenditures to obtain a more or less complete reduction of the iron-oxide-containing material charged.

The reaction kinetics of magnetite formation is influenced by the composition of the gas and of the solid. The molecules of the reducing gas must get from the outer gas flow through the adhering gas border layer and through the macropores and micropores to the site of reaction. There, the dissociation of oxygen takes place. The oxidized gas gets back on the same way. The ore grain is, thus, reduced from outside towards inside. Thereby, its porosity increases, since the dissociated oxygen leaves hollow spaces and the original volume of the ore grain hardly shrinks. The reaction front migrates from outside towards inside into the ore grain. With dense layers, the concentration of the reducing gas decreases from outside towards inside. The gas at first diffuses from outside through the already reduced shell as far as to the reaction front, where it is reacted and then diffuses back as a reaction product. With porous surfaces, the phase border reaction occurs on the walls of the pores within the reaction front, while the gas at the same time also may diffuse inside. With dense magnetite layers on the surface of the ore grain, the reaction kinetics is inhibited because the reducing gas is impeded from diffusing by exactly that layer and the mass transfer of the reducing gas thus cannot occur in the same manner as with porous ore grains.

The formation of a magnetite layer occurs very rapidly, i.e., the more rapidly the closer the temperature of the iron-oxide-containing material is to the limit temperature of about 580° C. According to the Baur-Glaessner diagram, such a formation of a dense magnetite layer on the surface of an iron ore grain primarily occurs up to a temperature of the iron ore of 580° C. upon contact with the reducing gas. At a temperature of the iron ore of below 400° C., the formation of magnetite is slowed down despite the contact with the reducing gas, and, as a result, dense magnetite layers are formed less rapidly.

In order to convert the previously mentioned magnetite formation or mixtures of magnetite and metallic iron, respectively, in further reduction steps to a largely metallic condition, longer retention times in the subsequent stage(s) of treatment or higher solid and/or gas temperatures are necessary.

Those phenomena lead to a number of disadvantages:
the formation of more abrasion from the solid due to longer retention times in the subsequent reduction stages,
an intensified metallization of this abrasion and hence increased tendency toward agglomeration of that material,
a substantial deterioration of the fluidization properties of the fluidized beds formed from that material,
the formation of adhesions in cyclones, downpipes (diplegs) and transport ducts (standpipes),
hence problems with the transfer of products
a low metallization of the final product.

Furthermore, those occurrences involve an increased need for reduction, a higher dust discharge (and hence an increased oxide consumption) and a larger amount of waste. It is particularly necessary to provide a reducing gas having a high reduction potential also in the fluidized-bed zones arranged to be first.

From WO-A-99/09220, it is known to adjust the temperature of the iron-oxide-containing material in the first fluidized-bed zone to either below 400° C. or to above 580° C. or to adjust the temperature to a range of from 400 to 580° C. in order to utilize the reducing gas both in regard of its reduction potential and in regard of its sensible heat, wherein, at a temperature adjustment to below 400° C., the temperature range of between 400° C. and 580° C. in the fluidized-bed zone arranged to follow the first fluidized-bed zone in the flow direction of the iron-oxide-containing material is passed through within a period of 10 minutes, preferably within 5 minutes, and wherein, at a temperature adjustment to above 580° C., the temperature range of between 400° C. and 580° C. is passed through within a period of maximally 10 minutes, preferably 5 minutes, and wherein, furthermore, at a temperature adjustment in the range of from 400° C. to 580° C., the iron-oxide-containing material remains within that temperature range for a maximum of 10 minutes, preferably 5 minutes, and is passed on into the fluidized-bed zone following next immediately after having reached the desired temperature.

By those measures, it is feasible to reduce the formation of magnetite layers down to a tolerable degree.

According to the process described in WO-A-99/09220, the transition of the temperature of the iron-oxide-containing material during heating from 400 to 580° C. is accomplished within as short a period of time as possible and maintenance within that critical temperature range is avoided. When rapidly passing that temperature range, the formation of a magnetite layer is extremely modest despite a reducing gas exhibiting a high or optimum reduction potential, respectively.

SUMMARY OF THE INVENTION

The invention aims at advancing the invention known from WO-A-99/09220 in accordance with the process in such a manner that the particulate material intended for reduction may be heated to a preheating temperature as high as possible already in the first reaction zone, whereby, however, the formation of phases that are difficult to reduce, such as magnetite in iron ore, may be avoided to a large extent, or even completely, and the above-described disadvantages of such phases will not occur. In particular, a time limit for preheating is to be avoided so that the material turnover per time unit is determined solely by reducing and not by preheating.

For iron ore, that object is achieved according to the invention in that, in order to achieve a maximum preheating temperature, the reducing gas added to the first reaction zone is conditioned such that no or hardly any reduction takes place, although for the particulate material a preheating temperature within the fringe range of starting a reduction is achieved, whereby either the degree of oxidation of the reducing gas is increased or the temperature of the reducing gas is decreased or both measures are carried out jointly and whereby, in the reactor zone arranged second for the iron ore, a temperature level of at least about 600° C., preferably in the range of between 600 and 700° C., in particular of between 620 and 660° C., is adjusted and the iron-oxide-containing material is reduced to wuestite.

In order to achieve a maximum preheating temperature for particulate material to be reduced, according to a preferred variant of the invention, the reducing gas added to the first reaction zone is conditioned such that no or hardly any reduction takes place, although for the particulate material a preheating temperature within the fringe range of starting a reduction is achieved, whereby either the degree of oxidation of the reducing gas is increased or the temperature of the reducing gas is decreased or both measures are carried out jointly and whereby, in the reaction zone arranged first for the particulate material, a maximum reduction speed of 0.2% oxygen removal per minute, preferably of 0.05% oxygen removal per minute, is maintained. That method is particularly suitable for the use of iron ore.

From "Steel Times International", March 2001, pages 20 and 22, it is known to suppress the formation of magnetite by lowering the reactor temperature of the preheating reactor to about 400° C. by means of injecting water. In doing so, magnetite formation is efficiently avoided, however, at the expense of the preheating temperature, thereby rendering necessary an increased supply of energy for heating up the material to be reduced in the reaction zones following the reduction zone arranged first for the particulate material.

According to the invention, it is feasible to achieve a higher preheating temperature than according to the prior art, which may even be that high that reduction would take place by means of the reducing gas—provided that it is untreated—effecting the preheating, which reduction, however, is prevented by increasing the degree of oxidation of the reducing gas. According to the invention, it is essential that the particulate material is heated up to a preheating temperature within the fringe range of starting a reduction caused by the preheating gas.

In doing so, a longer retention time in the reactor arranged first for the particulate material is rendered possible, whereby it becomes feasible to adapt the flow of material, i.e. the rate of charging through this reactor, to the subsequent reduction process. For the reduction process, preheating does not have to be taken into account.

Preferably, the adjustment of the temperature level and the degree of oxidation takes place independently of any fresh reducing gas used for reducing the particulate material, i.e. while avoiding the exertion of any influence on the chemical composition and the temperature of the reducing gas freshly supplied to the particulate material for final reduction.

The process according to the invention is particularly suitable for a fine-particulate material, i.e. a material having a particle size of up to 12 mm, preferably up to 10 mm, either in the form of monograins or in the form of a grain strip.

The process according to the invention allows that, in the first reaction zone, a temperature level of between 350° and 550° C., preferably of between 400 and 470° C., is adjusted.

By means of the high preheating temperature achieved in accordance with the invention, it is feasible that, in the reaction zone arranged second for the particulate material and in optionally existing further reaction zones, respectively, a temperature level that has been lowered as compared with the unaffected heat exchange is adjusted.

Advantageously, the adjustment of the temperature level in the reaction zone arranged first for the particulate material is effected by injecting $H_2O$ in liquid and/or vaporous form into that reaction zone and/or into the reducing gas supplied to this reaction zone.

According to a further preferred embodiment, the adjustment of the temperature level in the reaction zone arranged first for the particulate material is effected by admixing a cold gas to that reaction zone and/or to the reducing gas supplied to this reaction zone, such as by admixing cold $CO_2$ and/or a cold reducing gas.

A further suitable embodiment is characterized in that the adjustment of the degree of oxidation of the reducing gas in the reaction zone arranged first for the particulate material is effected by supplying vaporous and/or liquid $H_2O$ into this reaction zone and/or into the reducing gas supplied to this reaction zone.

However, the adjustment of the degree of oxidation of the reducing gas in the reduction zone arranged first for the particulate material may also be effected by injecting $CO_2$ and/or $CO_2/H_2O$-mixtures into this reaction zone and/or into the reducing gas supplied to this reaction zone.

By means of the invention, an average retention time for the particulate material of up to 40 minutes, preferably up to 30 minutes, may be maintained in the reaction zone arranged first for the particulate material, and a temperature level of between 760 and 850° C., preferably in the range of from 770 to 800° C., may be adjusted in the reaction zone arranged last for the iron ore. By the latter measure, "sticking"—an agglomeration of the particles remaining in the fluidized bed during iron-ore reduction of sponge iron—may be avoided.

Suitably, the invention is realized by one or several of the following measures:
 by varying the degree of oxidation of the fresh reducing gas,
 by adjusting the temperature of the reducing gas,
 by adjusting the retention time in the reaction zones following the second reaction zone for the iron ore,
 by adjusting the specific amount of reducing gas,
 by adjusting the composition of the reducing gas, in particular by varying the content of methane and/or the content of inert gas in the reducing gas.

Preferably, the reducing gas emerging from the reaction zone arranged to follow the reaction zone arranged first for the particulate material in the flow direction of the material is introduced only partially into the first reaction zone, after cooling and scrubbing, and, suitably, the reducing gas emerging from the reaction zone arranged first for the particulate material is recirculated at least partially into the first reaction zone.

According to the invention, it is endeavoured that the CO content of the reducing gas amounts to less than 20% and preferably is within a range of between 4 and 10%, as well as that, in the reaction zone arranged first for the particulate iron ore, a vapour/carbon-ratio ranging from 2.5 to 5, preferably ranging from 2.5 to 4, is adjusted for the reducing gas.

In order to avoid an interruption of the reduction process when the supply of metal-containing particulate material is interrupted, the temperature in the reaction zones, advantageously, is cooled down, preferably by regulating the temperature of the reducing gas and/or by injecting $H_2O$ or $CO_2$, respectively.

BRIEF DESCRIPTION OF THE DRAWINGS

In the following, the invention is described in more detail by way of the drawing, wherein.

DESCRIPTION OF A PREFERRED EMBODIMENT

Figure 1:
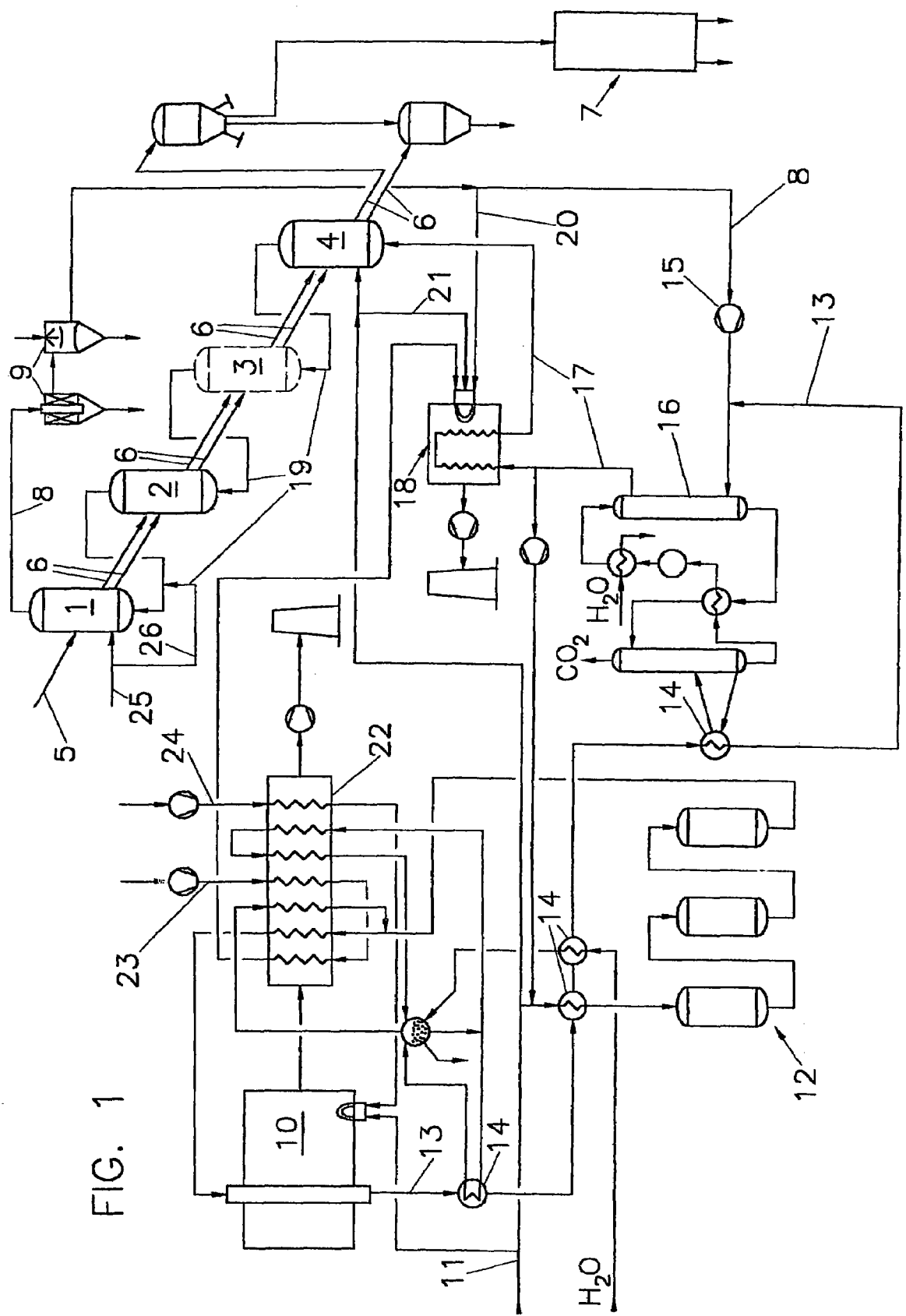
FIG. 1 illustrates a process scheme according to a preferred embodiment.

The plant represented in FIG. 1 has four fluidized-bed reactors, 1 to 4, subsequently connected in series, wherein iron-oxide-containing ore, such as fine ore, via an ore feed duct 5 is fed to the first fluidized-bed reactor 1, in which heating up to a predetermined temperature takes place, as will be explained in more detail in the following. Subsequently, the fine ore, f.i. having a chemical composition according to the following table, is conducted from fluidized-bed reactor to fluidized-bed reactor via the feed ducts 6, with fluidized-bed zones forming within each fluidized-bed reactor 1 to 4. The completely reduced material (sponge iron) is hot-briquetted in a briquetting means 7. If necessary, the reduced iron is protected from reoxidation during briquetting by an inert-gas system that is not represented.

| | Chemical analysis of the fine ore (percent by weight) | | | | | | | | |
|---|---|---|---|---|---|---|---|---|---|
| Fetot | $Fe_2O_3$ | FeO | CaO | $SiO_2$ | $Al_2O_3$ | MgO | $TiO_2$ | C | LOI |
| 67.8 | 96.9 | 0.06 | 0.06 | 1.38 | 0.6 | 0.04 | 0.04 | 0.01 | 0.95 |

Before the fine ore is introduced into the first fluidized-bed reactor 1, it is subjected to ore preparation, such as drying and screening, which is not represented in detail.

In counterflow to the ore flow, reducing gas is conducted from fluidized-bed reactor 4 to fluidized-bed reactors 3 to 1 and, via a top-gas discharge duct 8, is discharged as a top gas from the fluidized-bed reactor 1, arranged last in the direction of the gas flow, and is cooled and washed in a wet scrubber 9.

Production of the reducing gas is done by reforming natural gas supplied via duct 11 and desulfurized in a desulfurization plant 12, in a reformer 10. The gas formed from natural gas and vapour and leaving the reformer 10 substantially consists of $H_2$, CO, $CH_2$, $H_2O$ and $CO_2$. Via the reformed gas duct 13, this reformed natural gas is fed to one or several heat exchangers 14, in which it is cooled down to 80 to 150° C., whereby water is condensed out of the gas.

After compressing the top gas by means of a compressor 15, the reformed gas duct 13 runs into the top-gas discharge duct 8. The mixed gas thus forming is passed through a $CO_2$-scrubber 16 and is freed from $CO_2$ as well as from $H_2S$. It now is provided as a reducing gas. Via a reducing gas feed duct 17, that reducing gas is heated up to a reducing gas temperature of about 840° C. in a gas heater 18 arranged to follow the $CO_2$-scrubber 16 and is supplied to the fluidized-bed reactor 4 arranged first in the direction of the gas flow, where it reacts with the fine ores in order to generate directly reduced iron. The fluidized-bed reactors 4 to 1 are connected in series; the reducing gas gets from fluidized-bed reactor to fluidized-bed reactor via the connecting ducts 19. The number of fluidized-bed reactors conforms to the conditions such as the properties of the reducing gas, the desired reduction gradient etc.. For example, the fluidized-bed reactor 3, illustrated as dashed, could be omitted so that the process would be operated in three stages.

A portion of the top gas is sluiced out of the gas circuit 8, 17, 19 in order to avoid the enrichment of inert gases such as $N_2$. The sluiced out top gas is supplied to the gas heater 18 through a branch duct 20 for heating the reducing gas and is burnt there. Possibly lacking energy is supplemented with natural gas, which is fed via feed duct 21.

The sensible heat of the reformed natural gas emerging from the reformer 10 and of the reformer smoke gases is utilized in a recuperator 22 to preheat the natural gas after passage through the desulfurization plant 12, to produce the vapour required for reformation and to preheat the combustion air fed to the gas heater 18 via duct 23 as well as, if desired, also the reducing gas. The combustion air fed to the reformer 10 through duct 24 is preheated as well.

In order to avoid or minimize the formation of magnetite, the reduction process is carried out as follows according to a first preferred variant:

An amount of 110 t/h of iron ore is charged into the fluidized-bed reactor 1. The iron ore is dried and has a temperature of about 70° C.

The fresh reducing gas supplied to the fluidized-bed reactor 4 via duct 17 has a temperature of 840° C. and is supplied in an amount of 2,150 Nm³/t of ore. Its chemical composition is shown in the following table.

|  | $H_2$ | CO | $CH_4$ | $CO_2$ | $N_2$ | $H_2O$ |
|---|---|---|---|---|---|---|
| Vol % | 61 | 6 | 22 | 2.5 | 7 | 1.5 |

Upon entering the second fluidized-bed reactor, the reducing gas has a temperature of 720° C., and upon entering the fluidized-bed reactor 1, it has a temperature of 640° C. Therefrom, it emerges at a temperature of 450° C.

In the fluidized-bed reactor 1, the iron ore is preheated to a temperature of about 450° C., which is rendered feasible by reducing the reduction potential of the reducing gas supplied to the fluidized-bed reactor 1 or by increasing its degree of oxidation, respectively, without or almost without any formation of magnetite. According to the invention, that is effected by injecting water exhibiting a temperature of 40° C. Amounting to 15 Nm³/h, it either is introduced directly into the fluidized-bed reactor 1 via duct 25, or it is supplied to the duct 19 connecting the fluidized-bed reactors 2 and 1 via duct 26. In doing so, the temperature of the reducing gas is reduced by about 100° C., and the reduction potential is decreased and the degree of oxidation is increased, respectively, according to the definition:

$$\text{reduction of oxidation} = \frac{CO_2 + H_2O}{CO + CO_2 + H_2O + H_2}$$

Upon passing the upper fluidized-bed reactor 1, a change in the composition of the reducing gas essentially is caused merely by the addition of water, since no reaction takes place. The degree of oxidation before and after the injection of water, respectively, increases in accordance with the amount of water that is injected.

The iron ore preheated to 450° C. is partially reduced in the fluidized-bed reactor 2 and gets into the fluidized-bed reactor 3 at a temperature of 640° C. After complete reduction in the fluidized-bed reactor 4, it exhibits a metallization of 92.5%.

It has been shown that by injecting water into the fluidized-bed reactor 1, it was possible to effectively avoid the formation of magnetite, despite the fact that the iron ore was preheated to a temperature of 450° C., at which temperature the reducing gas utilized for heating, which, as mentioned above, exhibits a temperature of 640° C. upon introduction into the fluidized-bed reactor 1, would cause prereduction.

By the measure according to the invention, it is feasible to reduce the reduction potential of the partially consumed reducing gas, which is utilized for heating up the iron ore, to such an extent that reduction, if any, does not take place at all, with the residence time of the iron ore in the fluidized-bed reactor 1 being almost optional. The trials have shown that a certain very small prereduction may take place, which, however, is innocuous for any reduction in the subsequent fluidized-bed reactors 2 to 4. Such prereaction may take place to a maximum of 0.2% oxygen removal/minute. Most ores turn out to exhibit reduction rates of <0.05% $O_2$ removal per minute.

Thus, according to the invention, preheating is effected in the fringe range of starting a reduction, whereby it is essential that the temperature of the reducing gas utilized for preheating is kept as high as possible, first of all, in order to achieve a high preheating temperature and, secondly, in order to be able to adjust a high temperature level in the fluidized-bed reactor 2, at which temperature level the formation of wuestite results directly, without any inhibition caused by magnetite. During the reduction of iron ore, it is to amount to at least about 600° C., preferably to 620-660° C.

In accordance with a variant of the invention, the adjustment of a high preheating temperature may also be achieved by supplying a stream of liquid $CO_2$ through the ducts 25 and 26, whereby the water added according to the above-indicated exemplary embodiments might be substituted for a stream of 50 Nm³/h $CO_2$, with the same effect being achieved. It is also feasible to use mixtures of $CO_2$ and $H_2O$ for conditioning the reducing gas.

For the process according to the invention, a counterflow between the preheating gas and the particulate material to be preheated is not decisive but heat exchange may take place in various ways, f.i. also in the crosscurrent.

Figure 2:
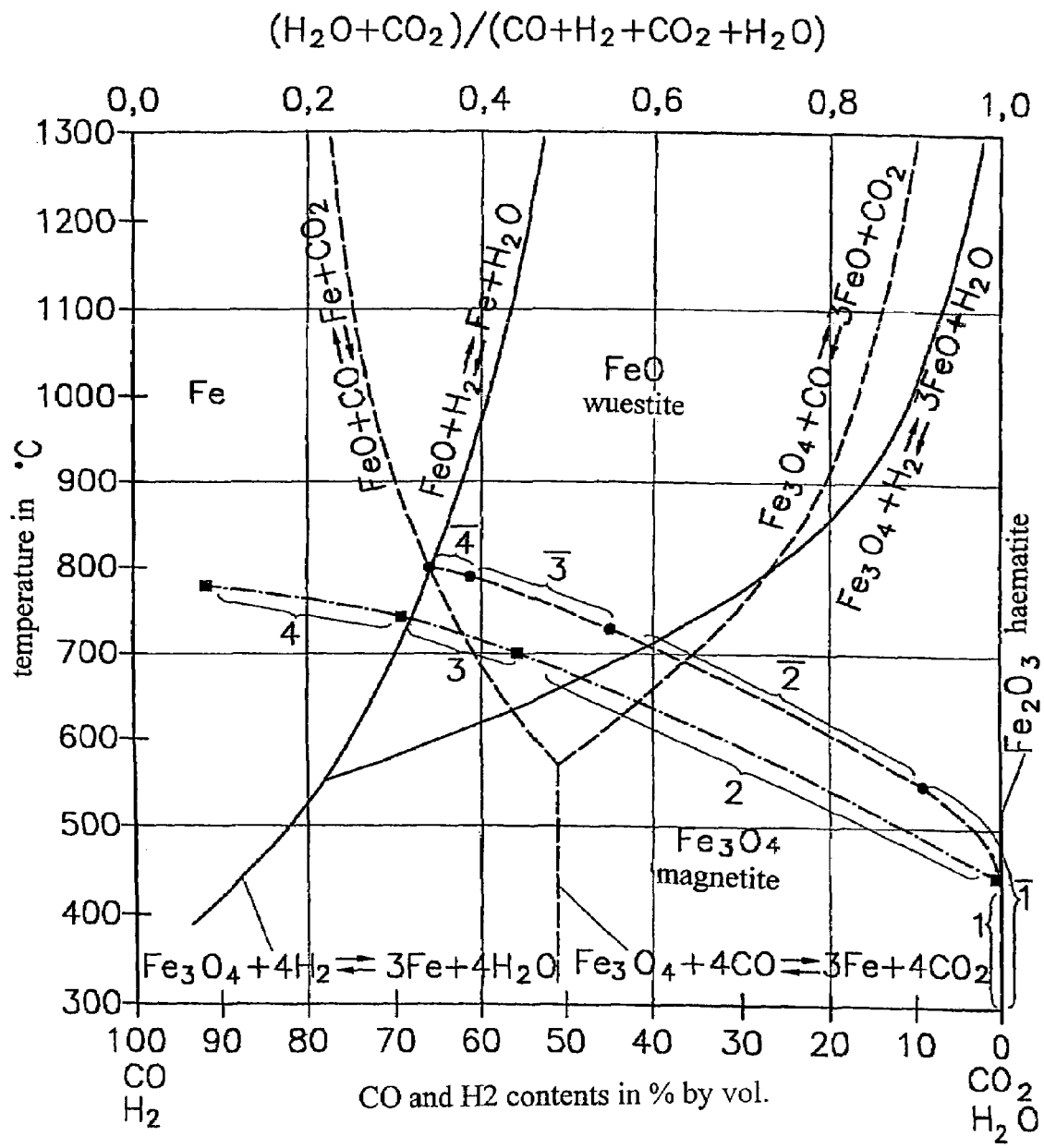
FIG. 2 shows the Baur-Glaessner diagram, wherein the course of reduction is plotted without measures according to the invention and with measures according to the invention.

From FIG. 2, the Baur-Glaessner diagram, it is apparent that, in a reduction process without measures according to the invention, a formation of magnetite takes place already in the fluidized-bed reactor arranged first for the material to be reduced. That process is illustrated by means of round dots and a dotted line. (The Baur-Glaessner diagram is to be understood as a thermodynamic diagram and therefore is independent of the reaction kinetics and hence also of the previous history of the reduction.)

The curved dotted brackets in the Baur-Glaessner diagram, which are denoted by 1 to 4, characterize the course of the procedure according to the reduction, in accordance with the prior art, in the equally numbered reactors, i.e. without any measures of the invention; the squares as well as the continuous line and the continuous brackets 1 to 4 illustrate the reduction process of the invention, such as it takes place in the equally numbered reactors 1 to 4.

Due to the measures according to the invention, f.i. a temperature reduction in the fluidized-bed reactor 1 to about 450° C., a formation of magnetite in the fluidized-bed reactor 1 is avoided almost entirely.

Figure 3A:
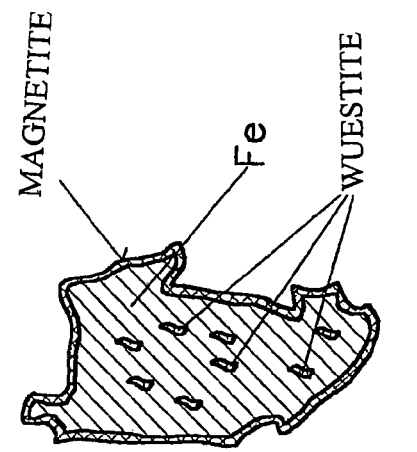
FIGS. 3a and 3b illustrate reduction processes by way of a haematite grain.
Figure 3A:
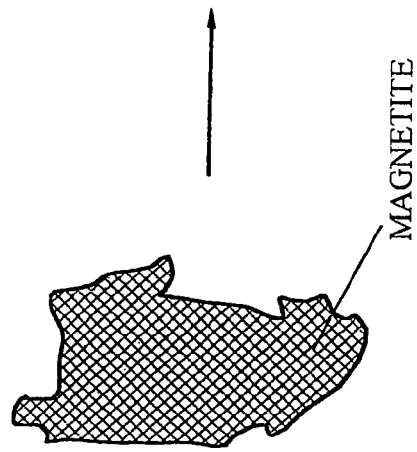
Figure 3A:
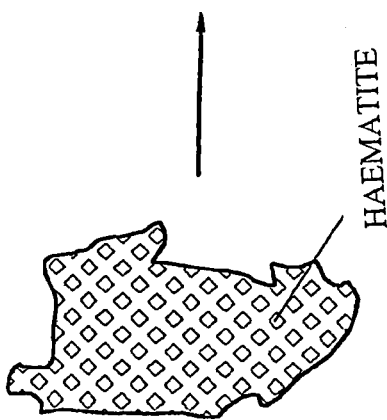
Figure 3B:
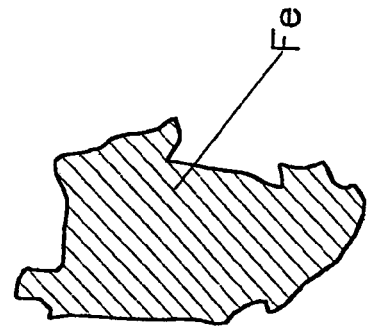
Figure 3B:
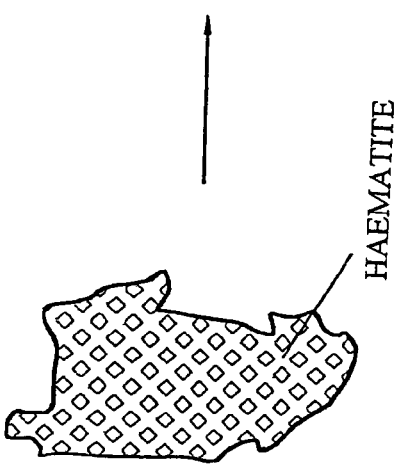
Figure 3B:
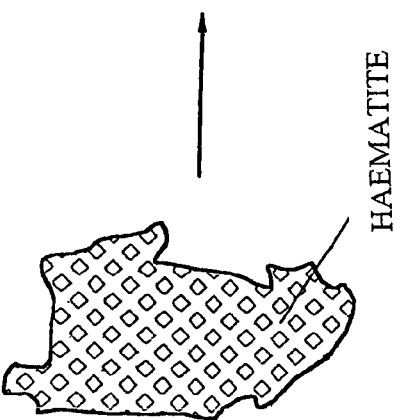

FIG. 3A schematically shows the magnetite formation during conventional reduction, wherein, by means of low-temperature reduction in the fluidized-bed reactor 1, a dense magnetite forms from a haematite grain at about 550° C., wherefrom a dense metallic iron comprising enclosed wuestite and a rim zone of magnetite covering the grain is formed by the subsequent reduction at high temperatures in the fluidized-bed reactors 2, 3 and 4. In contrast to that, the reduction according to the invention is illustrated in FIG. 3B, wherein no reduction takes place in the fluidized-bed reactor 1 at a temperature of about 450° C. so that the haematite used in the fluidized-bed reactor 1 as such gets into the fluidized-bed reactor 2. There as well as in the subsequent fluidized-bed reactors 3 and 4, high-temperature reduction takes place, wherefrom a highly porous sponge iron not liable to "sticking" results.

The process according to the invention provides an essential improvement of the energy balance, since a reduction of the reducing-gas temperature in the reactors consecutively arranged for the particulate material, i.e. in the fluidized-bed reactors 2 to 4, is feasible due to the high preheating in the fluidized-bed reactor 1, which, in contrast to the known preheating process, may reach 50° C. or even more, in particular the reducing-gas temperature in the reactor arranged last for the particulate material may be reduced, thereby substantially reducing the danger of "sticking" of the completely reduced material, i.e. the sponge iron, in the fluidized bed. An improvement of the flowability of the fines in the transfer lines results as well, since also in that case the danger of "sticking" is minimized. A further essential advantage consists in the reduction of the danger of high-temperature corrosion (metal dusting) during heating, transport and distribution of the gas.

A further essential advantage of the process according to the invention is to be seen in that, with simple means, it is feasible to adjust a temperature profile in the entire reactor cascade, since merely the amount of water or optionally the amount of $CO_2$, respectively, must be adjusted to that end. In contrast to that, so far it has been necessary to regulate the amount of gas, whereby the empty-tube speed had to be responded to by constantly varying the pressure of the entire cascade.

The process according to the invention is advantageous not only for the reduction of iron ore, but also for other metal oxides such as, f.i., wolfram oxide, vanadium oxide or molybdenum oxide, which metals serve, f.i., as additives in the production of hard metals.

The invention claimed is:

1. A process for reducing iron ore-containing particulate material in an at least two-stage process performed in an apparatus comprising a plurality of reaction zones arranged consecutively in series and formed by a moving particulate material, the process comprising:
   conducting a reducing gas not containing $O_2$ through at least a first one of the reaction zones in a gas pathway and then through a second one of the reaction zones in the gas pathway consecutively in the series, the reaction zones in the gas pathway being gas pathway reaction zones;
   moving particulate material consecutively through the series of reaction zones in the reverse sequence to the sequence of the conduction of reducing gas through the series of reaction zones, through a first one of reaction zones in a particulate pathway and then through a second one of the reaction zones in the particulate pathway, the reaction zones in the particulate pathway being particulate pathway reaction zones;
   heating the particulate material in the first particulate pathway reaction zone and reducing the particulate material in each of the further particulate pathway reaction zones consecutively in the series by the reducing gas that is being conducted through the reaction zones;
   adding reducing gas to the first particulate pathway reaction zone and conditioning the reducing gas added to the first particulate pathway reaction zone so that oxygen bound to the iron ore is removed at a maximum reduction speed of 0.2% oxygen removal per minute, wherein the reducing gas added to the first particulate pathway reaction zone is conditioned by at least one selected from increasing the degree of oxidation of the reducing gas, and decreasing the temperature of the reducing gas, or both carried out jointly, so that a range of no reduction to hardly any reduction occurs in the first particulate pathway reaction zone, the preheating of the particulate material being sufficient for causing a preheating temperature of the particulate material within the fringe range of starting of reduction, and
   removing oxygen bound to the iron ore at a maximum maintained reduction speed of 0.2% oxygen removal per minute in the first particulate pathway reaction zone, adjusting the temperature level in the first particulate pathway reaction zone to be between 350° and 550° C., and maintaining an average retention time for the particulate material in the first particulate pathway reaction zone of up to forty minutes,
   wherein the temperature level in the second particulate pathway reaction zone is at least 600° C.

2. The process of claim 1, further including reducing iron-oxide-containing particulate material in the second particulate pathway reaction zone to wuestite.

3. The process of claim 2, wherein the temperature level in the second particulate pathway reaction zone is in the range of between 600 and 700° C.

4. The process of claim 2, wherein the temperature level in the second particulate pathway reaction zone is in the range of between 620 and 660° C.

5. A process according to claim 2, further comprising, in the first particulate pathway reaction zone, adjusting the temperature level for the particulate material in the first particulate pathway reaction zone with aid of the caloric content of the reducing gas to a temperature at which reduction of the particulate material would occur, and avoiding reduction at that temperature level by increasing the degree of oxidation of the reducing gas to an extent such that in the first particulate pathway reaction zone, in the range of no reduction to hardly any reduction occurs.

6. A process according to claim 2, wherein the adjustment of the temperature level and the increase of the degree of oxidation are conducted independently of introduction of any fresh reducing gas used for reducing the particulate material, while avoiding the exertion of any influence on the composition and temperature of the reducing gas that is freshly added to the particulate material for final reduction.

7. A process according to claim 2, wherein the particulate material is a fine particulate material having a particle size of up to 12 mm and is treated either in the form of monograins or in the form of a grain strip.

8. A process according to claim 2, further comprising, adjusting the temperature level in the first particulate pathway reaction zone for the particulate material by injecting $H_2O$ in liquid or vapor form into the first particulate pathway reaction zone or into reducing gas supplied to the first particulate pathway reaction zone.

9. A process according to claim 2, further comprising, adjusting the temperature level in the first particulate pathway reaction zone for the particulate material by admixing a cold gas in the first particulate pathway reaction zone or in the reducing gas supplied to the first particulate pathway reaction zone.

10. A process according to claim 9, wherein the mixing of cold gas comprises admixing cold $CO_2$ or a cold reducing gas.

11. A process according to claim 2, wherein adjusting the degree of oxidation of the reducing gas in the first particulate pathway reaction zone comprises supplying vaporous or liquid $H_2O$ into the first particulate pathway reaction zone or into the reducing gas supplied to the first particulate pathway reaction zone.

12. A process according to claim 2, wherein adjusting the degree of oxidation of the reducing gas in the first particulate pathway reaction zone comprises supplying $CO_2$ or $CO_2$ and $H_2O$ mixtures into the first particulate pathway reaction zone or into the reducing gas supplied to the first particulate pathway reaction zone.

13. A process according to claim 2, further comprising, adjusting a temperature level in the last one of the particulate pathway reaction zones in the range of between 760 and 850° C.

14. A process according to claim 2, further comprising, in the second particulate pathway reaction zone for the particulate material, adjusting a degree of oxidation for the imminent formation of wuestite by selecting at least one of:
varying the degree of oxidation of fresh reducing gas introduced into one of the particulate pathway reaction zones;
adjusting the temperature of the reducing gas;
adjusting the retention time in one of the particulate pathway reaction zones following the second particulate pathway reaction zone;
adjusting the reducing gas by a specific amount; and
adjusting the composition of the reducing gas including varying the content of methane or the content of inert gas in the reducing gas.

15. A process according to claim 2, wherein reducing gas emerges from the second particulate pathway reaction zone, the process further comprising cooling and scrubbing that reducing gas, then introducing that reducing gas partially into the first particulate pathway reaction zone.

16. A process according to claim 2, wherein reducing gas emerges from the first particulate pathway reaction zone, the process further comprising recirculating reducing gas emerging from the first particulate pathway reaction zone at least partially back into the first particulate pathway reaction zone.

17. A process according to claim 2, wherein the reducing gas has a CO content under 20%.

18. A process according to claim 2, further comprising adjusting the reducing gas for the first particulate pathway reaction zone to provide a water vapor/carbonaceous gaseous components ratio ranging from 2.5 to 5.

19. A process according to claim 2, wherein when a supply of metal containing particulate material is interrupted, cooling the temperature in the reaction zones by regulating temperature of the reducing gas or by injecting $H_2O$ or $CO_2$.

20. The process of claim 1, wherein the maximum maintained reduction speed is 0.05% oxygen removal per minute.

21. The process of claim 1, wherein iron ore is the particulate material.

22. A process according to claim 1, further comprising, in the first particulate pathway reaction zone, adjusting the temperature level for the particulate material in the first particulate pathway reaction zone with aid of the caloric content of the reducing gas to a temperature at which reduction of the particulate material would occur, and avoiding reduction at that temperature level by increasing the degree of oxidation of the reducing gas to an extent such that in the first particulate pathway reaction zone, in the range of no reduction to hardly any reduction occurs.

23. A process according to claim 1, wherein the adjustment of the temperature level and the increase of the degree of oxidation are conducted independently of introduction of any fresh reducing gas used for reducing the particulate material, while avoiding the exertion of any influence on the composition and temperature of the reducing gas that is freshly added to the particulate material for final reduction.

24. A process according to claim 1, wherein the particulate material is a fine particulate material having a particle size of up to 12 mm and is treated either in the form of monograins or in the form of a grain strip.

25. A process according to claim 1, further comprising, adjusting the temperature level in the first particulate pathway reaction zone for the particulate material by injecting $H_2O$ in liquid or vapor form into the first particulate pathway reaction zone or into reducing gas supplied to the first particulate pathway reaction zone.

26. A process according to claim 1, further comprising, adjusting the temperature level in the first particulate pathway reaction zone for the particulate material by admixing a cold gas in the first particulate pathway reaction zone or in the reducing gas supplied to the first particulate pathway reaction zone.

27. A process according to claim 26, wherein the mixing of cold gas comprises admixing cold $CO_2$ or a cold reducing gas.

28. A process according to claim 1, wherein adjusting the degree of oxidation of the reducing gas in the first particulate pathway reaction zone comprises supplying vaporous or liquid $H_2O$ into the first particulate pathway reaction zone or into the reducing gas supplied to the first particulate pathway reaction zone.

29. A process according to claim 1, wherein adjusting the degree of oxidation of the reducing gas in the first particulate pathway reaction zone comprises supplying $CO_2$ or $CO_2$ and $H_2O$ mixtures into the first particulate pathway reaction zone or into the reducing gas supplied to the first particulate pathway reaction zone.

30. A process according to claim 1, further comprising, adjusting a temperature level in the last one of the particulate pathway reaction zones for in the range of between 760 and 850° C.

31. A process according to claim 1, further comprising, in the second particulate pathway reaction zone for the particulate material, adjusting a degree of oxidation for the imminent formation of wuestite by selecting at least one of:
varying the degree of oxidation of fresh reducing gas introduced into one of the particulate pathway reaction zones;
adjusting the temperature of the reducing gas;
adjusting the retention time in one of the particulate pathway reaction zones following the second particulate pathway reaction zone;
adjusting the reducing gas by a specific amount; and
adjusting the composition of the reducing gas including varying the content of methane or the content of inert gas in the reducing gas.

32. A process according to claim 1, wherein reducing gas emerges from the second particulate pathway reaction zone, the process further comprising cooling and scrubbing that reducing gas, then introducing that reducing gas partially into the first particulate pathway reaction zone.

33. A process according to claim 1, wherein reducing gas emerges from the first particulate pathway reaction zone, the process further comprising recirculating reducing gas emerging from the first particulate pathway reaction zone at least partially back into the first particulate pathway reaction zone.

* * * * *